United States Patent
Rebori et al.

(10) Patent No.: US 6,224,041 B1
(45) Date of Patent: May 1, 2001

(54) SPLASH PLATE STRUCTURE FOR AERATORS

(75) Inventors: Robert J. Rebori, Shawnee; John W. Struewing, Overland Park, both of KS (US)

(73) Assignee: Smith & Loveless, Inc., Lenexa, KS (US)

( * ) Notice: Subject to any disclaimer, the term of this patent is extended or adjusted under 35 U.S.C. 154(b) by 0 days.

(21) Appl. No.: 09/322,519

(22) Filed: May 28, 1999

(51) Int. Cl.[7] .......................................................... B01F 3/04
(52) U.S. Cl. ............................ 261/30; 261/77; 261/121.1
(58) Field of Search ................................ 261/28, 30, 34.1, 261/35, 36.1, 87, 77, 93, 121.1

(56) References Cited

U.S. PATENT DOCUMENTS

| | | | |
|---|---|---|---|
| 594,522 | * | 11/1897 | Church ..................................... 261/77 |
| 708,058 | * | 9/1902 | Martinson ............................... 261/77 |
| 1,062,446 | | 5/1913 | Ernst . |
| 1,867,824 | | 7/1932 | Hammerly . |
| 2,030,454 | | 2/1936 | Kresser . |
| 3,228,526 | | 1/1966 | Ciabattari et al. . |
| 3,273,865 | | 9/1966 | White . |
| 3,521,864 | | 7/1970 | Welles, Jr. . |
| 3,572,658 | * | 3/1971 | Ravitts ..................................... 261/93 |
| 3,680,847 | | 8/1972 | Grutsch et al. . |
| 3,735,926 | * | 5/1973 | Ravitts ................................. 261/34.1 |
| 3,865,909 | | 2/1975 | Cramer, Jr. . |
| 3,904,714 | | 9/1975 | Rooney et al. . |
| 3,911,065 | | 10/1975 | Martin et al. . |
| 3,957,633 | | 5/1976 | Gatti et al. . |
| 3,966,599 | | 6/1976 | Burkhead . |
| 3,966,608 | | 6/1976 | Mason et al. . |
| 3,972,965 | * | 8/1976 | Higgins ................................... 261/91 |
| 4,070,423 | * | 1/1978 | Pierce ..................................... 261/77 |
| 4,145,383 | | 3/1979 | Randall . |
| 4,146,471 | | 3/1979 | Wyness . |
| 4,267,052 | | 5/1981 | Chang . |
| 4,336,144 | | 6/1982 | Franklin, Jr. . |
| 4,465,645 | * | 8/1984 | Kaelin ..................................... 261/87 |
| 4,569,757 | | 2/1986 | Moore . |
| 4,655,918 | | 4/1987 | Eertiak . |
| 4,681,711 | | 7/1987 | Eaton . |
| 4,849,101 | * | 7/1989 | Desjardins ............................. 261/77 |
| 4,863,644 | * | 9/1989 | Harrington et al. .................... 261/77 |
| 4,900,480 | | 2/1990 | Litz et al. . |
| 5,073,312 | | 12/1991 | Burrows . |
| 5,632,962 | | 5/1997 | Baker et al. . |
| 5,707,562 | | 1/1998 | Karliner . |

FOREIGN PATENT DOCUMENTS

328031 * 10/1920 (DE) ..................................... 261/77

* cited by examiner

Primary Examiner—C. Scott Bushey
(74) Attorney, Agent, or Firm—Rockey, Milnamow & Katz

(57) ABSTRACT

An aerator for a water treatment plant or water conditioning application, includes a draft tube for vertical positioning within a volume of water and an outlet structure overlying a top open end of the draft tube. Water is lifted or pumped through the draft tube out of the top open end. The outlet structure includes a stepped splash plate which deflects the water flowing out of the top open end in a cascading fashion which increases the oxygenation efficiency and spray pattern of the thus aerated water. Additionally, a blinder bracket is applied to the outlet structure to reduce flow from the outlet structure at a particular preselected arc. The draft tube and outlet structure can be molded as a unitary plastic piece, and flow windows and openings can be cut into the piece.

21 Claims, 3 Drawing Sheets

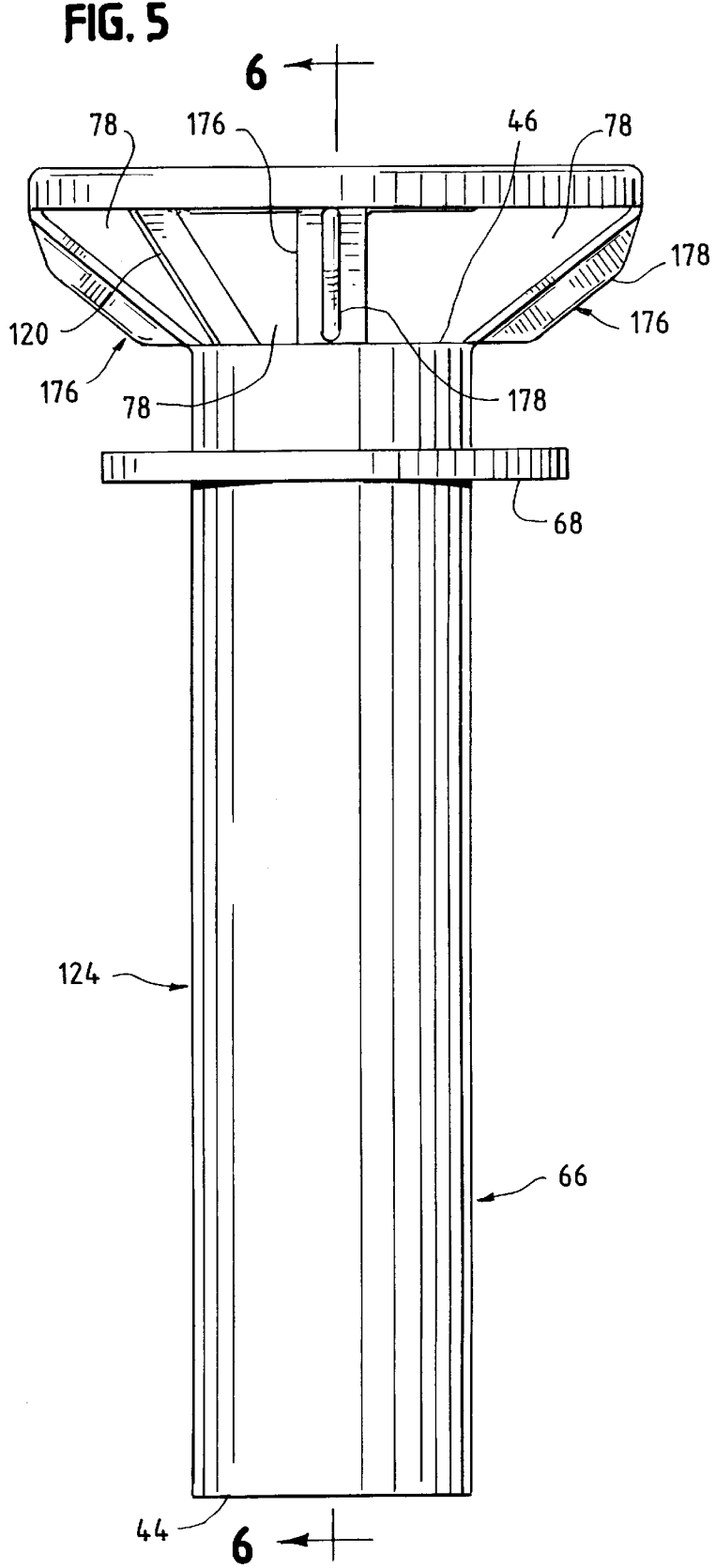

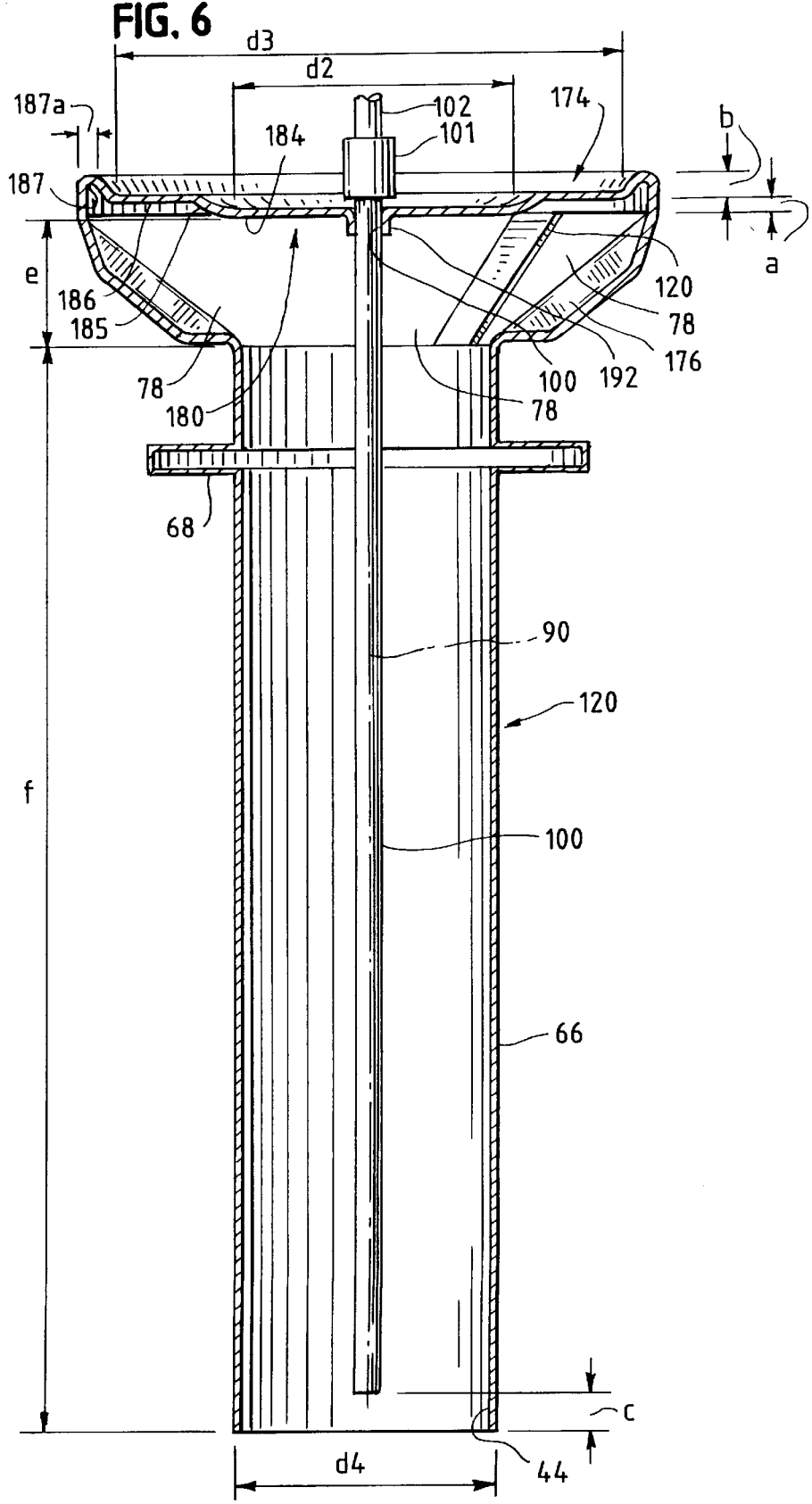

SPLASH PLATE STRUCTURE FOR AERATORS

TECHNICAL FIELD OF THE INVENTION

The present invention relates to aerators for treating water. Particularly the present invention relates to a splash plate structure which overlies an open top end of a draft tube of the aerator.

BACKGROUND OF THE INVENTION

Aerators are known which are utilized to increase the oxygen content of water, i.e., to "oxygenate" water, within a body of water. Aerators placed into a body of waste water have heretofore incorporated a draft tube having an open bottom end located at a depth of the waste water to be aerated, and an open top end extending near to the surface of the waste water. The aerator includes a mechanism for drawing water through the open bottom end and displacing the water vertically to mix with air as the water exits the open top end. In some apparatus, the mechanism is a rotary device such as a pump or an impeller while in other apparatus the device is a conduit for injecting pressurized air into the draft tube. The latter device is referred to as an "airlift".

Aerators of both types are disclosed in U.S. Pat. Nos. 3,466,608; 3,972,965; and 3,966,599.

Airlifts operate on the principal of using air to displace water to cause a pumping action of the water. Airlifts have been used to transfer water from one treatment zone to another and have been used in different types of water treatment systems. Airlifts also enhance mixing and oxygen transfer into a waste water stream to aid in the treatment of water and wastewater in aerobic water/waste water treatment processes.

It would be desirable to provide an apparatus which would increase the oxygenation and the oxygen transfer efficiency of an aerator useful in water treatment applications, particularly in waste water treatment processes.

Traditional airlifts, due to their configuration, also tend to allow a certain amount of water to escape the treatment zone without being fully treated. It would be desirable to provide an apparatus which would reduce this tendency.

SUMMARY OF THE INVENTION

The invention is directed to an aeration device for placing in a body of water which utilizes a draft tube with an open top end wherein a splash plate is elevated from, and overlies the open top end. The device directs water through the open top end and against the splash plate to deflect the water radially outwardly onto a surface of the body of water. The splash plate includes a stepped surface which is stepped upwardly and radially outwardly with horizontal surfaces of increasing horizontal dimensions. The stepped surface of the splash plate causes a cascading of water that is splashed against the splash plate and a resulting increased oxygenation effect. The splash plate of the invention improves the oxygen transfer efficiency of the aerator and improves the spray pattern of the water deflected off the splash plate while utilizing the same size treatment aeration zone within the body of water.

The splash plate of the invention can be incorporated into varying types of water pumping or water lifting devices. The invention is particularly adapted to an airlift type aerator having an air injection tube extending axially into the draft tube to supply a bottom region of the draft tube with a source of pressurized air. The air tube is supported on a top surface of the splash plate. The splash plate is mounted to the draft tube by a plurality of bars or brackets extending from a top end of the draft tube upwardly to the splash plate.

As an additional aspect of the invention, a blinder bracket or bar of preselected width, is arranged between the splash plate and a top end of the draft tube. The blinder bracket is sized and located to block and prevent a direct flow path between the draft tube and an outlet of the surrounding aeration vessel. Thus, flow from the draft tube can be selectively limited to certain arcs around a top end of the draft tube. The blinder bracket can be made as wide as desired to block flow out of a corresponding arc.

Advantageously, the aerator of the present invention is composed of plastic. The support structure between the draft tube and the splash plate can be configured as a hollow cone and preselected windows can be cut from the cone to form flow areas and intermittent support brackets and one or more blinder brackets. Advantageously, the draft tube and the hollow cone can be rotationally molded as a single hollow plastic piece. The windows and the open bottom end of the draft tube can be cut from the hollow plastic piece.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 5 is an enlarged elevational view of an alternate embodiment aerator; and FIG. 6 is a sectional view taken generally along line 6—6 of FIG. 5.

DETAILED DESCRIPTION OF THE PREFERRED EMBODIMENTS

Figure 3:
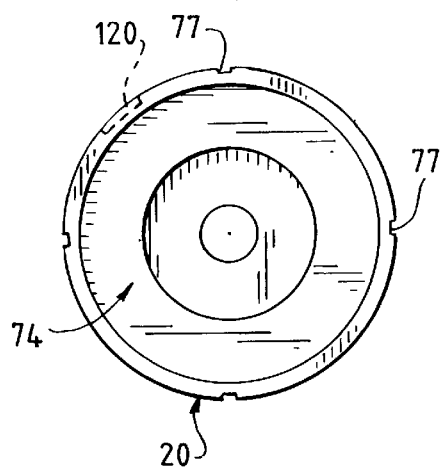
FIG. 3 is a top view of the aerator shown in FIG. 2.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
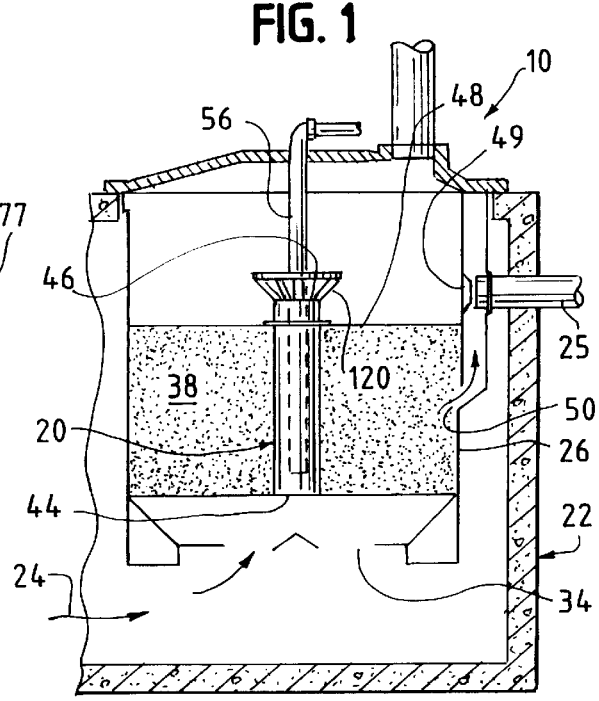
FIG. 1 is a fragmentary, schematic sectional view of a waste water treatment basin incorporating an aerator of the present invention.

FIG. 1 illustrates one example of a waste water treatment plant 10 which incorporates an aeration unit or aerator 20 of the present invention. The treatment plant includes a basin 22 having a waste water inlet, indicated by the arrow 24, and a waste water outlet 25. A shell 26 is held within the basin 22. The outlet 25 is connected into the shell 26. The tank shell 26 has an opening 34 through a bottom thereof. A filter media or other treatment media 38 is contained within the shell 26 and surrounds the aeration unit 20.

Waste water contained within the basin 22 is drawn into a bottom open end 44 of the aeration unit 20 and pumped through an open top end 46 of the aeration unit 20 to be distributed onto a top surface 48 of the media 38. The water passes through the media 38 to be drawn once again through the aeration unit 20. Aerated water passes through a surface outlet 49 and/or a submerged outlet 50 to travel out of the basin 22 through the basin outlet 25.

The aeration unit 20 can be of a type referred to as an "airlift". In this type of aeration unit, pressurized air is supplied via tube 56 into the aeration unit 20.

Figure 2:
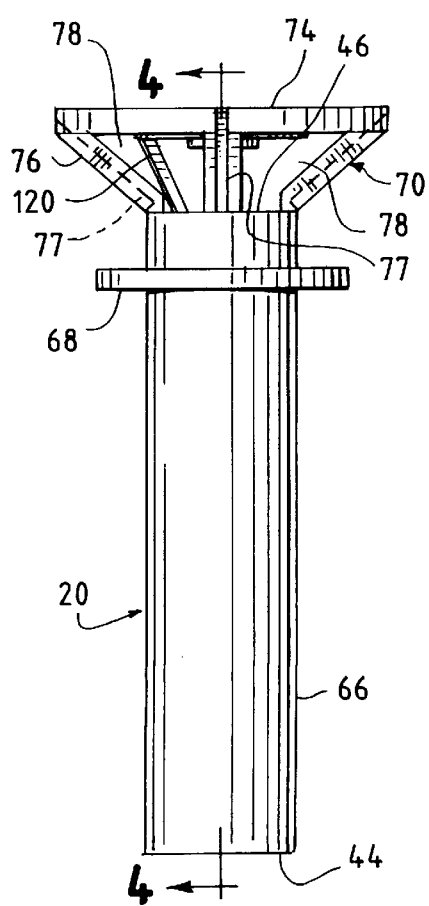
FIG. 2 is an enlarged, elevational view of the aerator shown in FIG. 1.

FIG. 2 illustrates the aeration unit 20 including a draft tube 66 having a support flange 68 which (as shown in FIG. 1) supports the aeration unit 20 on top of the media 38 (or other support structure). The draft tube 66 defines an open bottom end 44 and the open top end 46. Mounted to the draft tube 66 at the open top end 46 is an outlet structure 70. The outlet structure 70 includes a splash plate 74. The splash plate 74 is supported by four, evenly spaced brackets 76 extending from the draft tube 66. The support brackets 76 define windows 78 between adjacent support brackets 76. The windows 78 can be trapezoidally shaped. The support brackets 76 are preferably arranged at 90° points around the circumference of the draft tube 66. The support brackets 76 include longitudinally oriented, indented ribs 77 which stiffen the brackets 76.

Figure 4:
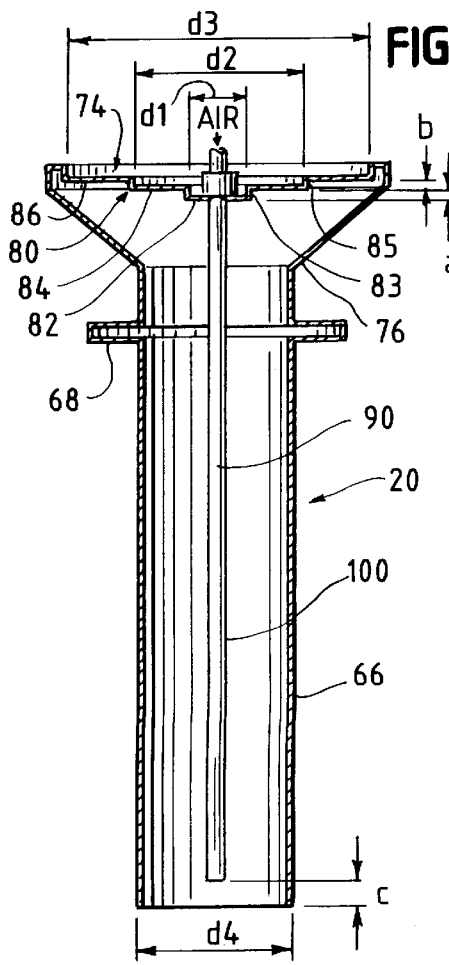
FIG. 4 is a sectional view taken generally along line 4—4 of FIG. 2.

As shown in FIGS. 3 and 4, the splash plate 74 is preferably circularly-shaped overall, and has a stepped bottom surface 80. The stepped bottom surface 80 includes a circular first surface 82 having a first outside diameter d1, an annular second surface 84 having a larger outer diameter d2, and an annular third surface 86 having a still larger outer diameter d3. The surfaces 82, 84, 86 are arranged coaxially about a centerline 90 of the draft tube 66. The surfaces 82, 84 are vertically spaced from each other by the dimension a, and the surfaces 84, 86 are spaced from each other by the dimension b.

The first surface 82 is connected continuously to the second surface 84 by a first annular edge wall 83. The second surface 84 is continuously connected to the third surface 86 by a second annular edge wall 85. The edge walls 83, 85 are arranged parallel to the centerline or axis 90 of the draft tube 66, i.e., perpendicular to the surfaces 82, 84, 86.

Although according to the preferred embodiment, the splash plate 74 and surfaces 82, 84, 86 have circular perimeters, other shapes, such as irregularly shaped, oblong or rectangular, are encompassed by the invention.

A mechanism for pumping water from the bottom open end 44 through the top open end 46 and against the splash plate 74 can be a rotary element such as an impeller for pumping water through the draft tube 66 or can be a source of pressurized air to hydraulically lift the water from the bottom open end 44 through the top open end 46 and against the splash plate 74. According to the latter example, a tube 100 penetrates the splash plate 74 through the surface 82 along the centerline 90 and extends down through the draft tube to within a short distance c from the bottom open end 44. The tube 100 is supported on the splash plate 74 by a coupling 101 which also serves to connect the tube 100 to a source of pressurized air 102 (shown schematically).

Referring back to FIG. 2, in a further aspect of the invention, a blinder bracket 120 is mounted within a window 78 to reduce the flow area of the window at a specific location. Particularly, the window 78 is reduced to block a direct radial flow route of water from the aerator 20, through the window 78, toward the outlets 49, 50 (shown in FIG. 1). By locating one or more blinder brackets of preselected width and location around the circumference of the outlet structure 70, water flow can be directed or limited in a preselected fashion for process reasons.

The blinder bracket prevents waste water (which may contain solids) from exiting the treatment zone prematurely, via a direct or shortened route, to the waste water outlet 25, thus preventing water that has not been completely treated from escaping the treatment zone as effluent. The blinder bracket interrupts the spray pattern along a direction that is toward where the treatment zone outlet(s), such as the outlets 49, 50, is (are) located. The blinder bracket can have as an additional function, the adding of structural stability to the splash plate along with the four regular brackets 76.

The splash plate 74 works as a reverse cascading aerator. Operation of the airlift occurs when water rises up the center flume of the draft tube and comes in contact with the multiple surfaces 82, 84, 86.

As a result, water splashes off the first horizontal surface 82, and then continues upwardly cascading to the second horizontal surface 84, and then cascading to the third horizontal surface 86, before eventually being dispersed downwardly and outwardly into the water treatment zone. This additional cascading process allows for additional oxygenation (mixing of air and water) for aerobic waste water treatment as well as improving the spray pattern over the entire water treatment zone. The improvement of the spray patters helps to improve the oxygen transfer efficiency (the amount of energy required to put air into the water) so that less energy is required to conduct oxygenation.

According to the preferred embodiment of the invention, the splash plate 74 is a stepped, single thickness molded plastic piece. A stacking of solid plates, for example, to arrive at the stepped configuration of the splash plate is also encompassed by the invention.

The outlet structure 70 can also be molded as a single, conically shaped plastic piece and the windows 78 can be removed as desired from the single conically shaped plastic piece. The draft tube 66 can be molded together with the flange 68 as a single thickness piece. Plural pieces that can be pre-molded and attached together, or the support flange 68 can be an annular piece fastened around a separate tube.

According to one exemplary embodiment of the present invention, the inside diameter of the draft tube d4 is 4 inches, the diameter d1 is 2⅜ inches, the diameter d2 is 4¾ inches, the diameter d3 is 8½ inches and the tube 100 is a 1½ inch, schedule 40 pipe. The distance between the splash plate and the bottom open end is approximately 30½ inches and the distance between the bottom open end and the top open end is approximately 27 inches. The dimension a is between ⅜ and ½ inch and the dimension b is ⅜ inch.

Advantageously, the ratio of d1 to d4 can be about 0.6 to 1; the ratio of d2 to d4 can be about 1.2 to 1; and the ratio of d3 to d4 can be about 2.1 to 1. Preferably, the ratio of d2 to d4 is at least about 1 to 1 and the ratio of d3 to d4 is at least about 2 to 1. The diameter d2 is preferably greater than d4 so that all of the water passing through the draft tube splashes against the surfaces 82, 84 initially.

An alternate embodiment aerator 124 is illustrated in FIGS. 5 and 6. According to this embodiment, support brackets 176 support a splash plate 174 above the draft tube. The brackets 176 include longitudinally extending, outwardly formed ribs 178 for effecting stiffening of the brackets 176. Two annular surfaces 184, 186 are provided on the splash plate 174. An outer annular surface 187 having a width 187a of about 0.5 inch surrounds the second annular surface 186. The surfaces 184, 186 are continuously connected by an oblique wall 185 to create a smooth transition between the two surfaces 184, 186. An opening 190 for receiving the air tube 100 is reinforced by an integral sleeve 192. The tube 100 includes the coupling 101 which sets onto the plate 174 to support the tube 100. The coupling is shown slightly elevated from the plate 174 only for simplicity of description. The tube 100 can be secured to the plate 174 by gravity, or by an adhesive, or by the use of opposed threaded couplings (not shown) which capture the plate 174 therebetween.

According to the second embodiment, the dimension d4 is about 6", the dimension d2 is about 6¾", and the dimension d3 is about 12½. The tube 100 is preferably a 2" schedule 40 plastic pipe. Advantageously, the ratio of d2 to d4 can be about 1.1 to 1; the ratio of d3 to d4 can be about 2.1 to 1. The dimension d2 is slightly larger than the dimension d4 to ensure the water passing up vertically through the tube 66 strikes the surface 184. Preferably, the ratio of d2 to d4 is at least about 1 to 1 and the ratio of d3 to d4 is at least about 2 to 1. The dimension a can be approximately 3/16 inch. The dimension b can be approximately 3/8 inch. A window dimension e can be approximately 3½ inches. A dimension f can be about 27 inches.

The outlet section 70, the support flange 68 and the draft tube 66 are advantageously molded as a unitary plastic piece in a rotary mold which uses centrifugal force to mold the hollow piece against an inside surface of the mold volume. After molding, the openings 190, 44 and 78 are cut into the piece. By molding the entire aerator 124 (except for the air tube 100) of one plastic piece, a significant cost savings results due to reduced assembly labor and parts costs. The embodiment of FIGS. 2 and 4 can be similarly manufactured.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An aerator, comprising:

a draft tube having an open top end and an open bottom end;

an outlet structure mounted to said top open end of said draft tube, said outlet structure including a splash plate having a stepped surface spaced above and facing toward said open top end, said stepped surface including first and second surfaces having circular outside perimeters of increasing diameters, arranged respectively at increasing distances from said open top end, said first and second surfaces being planar and extending perpendicularly to an axis of said draft tube, said first surface having a diameter at least equal to said open top end and arranged directly above said open top end to be impacted by water delivered from said open top end, said water cascaded from said first surface to said second surface.

2. The aerator according to claim 1 comprising an air conduit extending into said draft tube for lifting water from said open bottom end to said open top end.

3. The aerator according to claim 1, wherein said first and second surfaces are interconnected by an edge wall extending obliquely to said axis.

4. The aerator according to claim 1, comprising a plurality of brackets, and wherein said splash plate is elevated above said open top end by said brackets.

5. The aerator according to claim 4, wherein said open top end of the draft tube has a circularly-shaped opening, and wherein said first and second surfaces have diameters in the ratios of about 1 to 1 and 2 to 1 respectively compared to a diameter of the circularly-shaped opening.

6. The aerator according to claim 5, wherein said first and second surfaces are coaxially arranged.

7. The aerator according to claim 1, wherein said open top end has a circularly-shaped opening, and wherein said first surface has a diameter about equal to a diameter of said circularly-shaped opening.

8. The aerator according to claim 1 comprising a third surface, wherein said third surface has a circular perimeter having a diameter greater than said second surface and is supported at a distance from said top open end by brackets extending from said draft tube.

9. The aerator according to claim 1 comprising a blinder bracket mounted between said second annular surface and said top open end, said blinder bracket having a width to block flow through said outlet structure along a preselected arc.

10. An aerator, comprising:

a draft tube having a top end;

a pump device exerting a hydraulic pressure to force water upwardly through said draft tube;

a first surface having a circular perimeter and located spaced from and above said top open end;

a second annular surface fixedly connected to said first surface, elevated from and surrounding said first annular surface;

a third annular surface fixedly connected to said second surface and fixedly connected to said draft tube at a position elevated above said top open and, and elevated from and surrounding said second annular surface;

said first, second and third surfaces arranged coaxially with an axis of said draft tube, and connected together to provide a stepped surface.

11. The aerator according to claim 10, wherein said pump device comprises an air delivery tube extending into said draft tube.

12. The aerator according to claim 11, wherein said air delivery tube extends through a center hole of said first annular surface to a preselected depth within said draft tube.

13. An aerator, comprising:

a vertically arranged draft tube having a substantially open bottom and and a substantially open top end;

a splash plate arranged above said open top end and having a stepped surface having horizontal annular surfaces facing said open top end; and an air conduit having an open submerged end, said conduit extending to locate said open submerged end at a position within said draft tube near said bottom end.

14. The aerator according to claim 13, wherein said annular surfaces include first and second annular surfaces, said first annular surface surrounds said conduit, and said second annular surface surrounds said first annular surface.

15. The aerator according to claim 14, wherein said top open end has a circularly-shaped opening, and said annular surfaces include a third annular surface surrounding said second annular surface, and wherein said first, second and third surfaces have diameters in the ratios of about 0.6:1, 1:1 and 2:1 respectively compared to a diameter of the circularly-shaped opening.

16. The aerator according to claim 13 comprising brackets connecting said splash plate to said draft tube, said brackets integrally molded with said splash plate.

17. The aerator according to claim 13 comprising a plurality of brackets, wherein said draft tube and said splash plate are connected by said plurality of brackets, and said draft tube, said splash plate and said brackets are molded as a unitary plastic piece.

18. An aerator, comprising:
   a vertically arranged draft tube having a substantially open bottom end and a substantially open top end;
   a splash plate arranged above said open top end and having a stepped surface facing said open top end;
   an air conduit having an open submerged end, said conduit extending to locate said open submerged end at a position within said draft tube near said bottom end; and
   a plurality of brackets, wherein said draft tube and said splash plate are connected by said plurality of brackets, and said draft tube, said splash plate and said brackets are molded as a unitary plastic piece.

19. The aerator according to claim 18, wherein said stepped surface includes first and second annular surfaces, said first annular surface surrounds said air conduit, and said second annular surface surrounds said first annular surface.

20. The aerator according to claim 19 wherein said stepped surface includes a third annular surface surrounding said second annular surface.

21. An aerator, comprising:
   a vertically arranged draft tube having a substantially open bottom and and a substantially open top end;
   a splash plate arranged above said open top end and having a stepped surface facing said open top end; and
   an air conduit having an open submerged end, said conduit extending to locate said open submerged end at a position within said draft tube near said bottom end, wherein said stepped surface includes first, second and third annular surfaces, said first annular surface surrounds said conduit, and said second annular surface surrounds said first annular surface, said third annular surface surrounds said second annular surface, wherein said top open end has a circularly-shaped opening, and wherein said first, second and third surfaces have diameters in the ratios of about 0.6:1, 1:1 and 2:1 respectively compared to a diameter of the circularly-shaped opening.

\* \* \* \* \*

UNITED STATES PATENT AND TRADEMARK OFFICE
CERTIFICATE OF CORRECTION

PATENT NO.    : 6,224,041 B1
DATED         : May 1, 2001
INVENTOR(S)   : Robert J. Rebori et al.

It is certified that error appears in the above-identified patent and that said Letters Patent is hereby corrected as shown below:

Column 4,
Line 24, delete "patters" and replace with "patterns"

Column 6,
Line 23, insert the word "open" between the words "top" and "end"
Line 34, delete "and," (first occurrence)
Line 47, delete "and" (first occurrence)

Column 8,
Line 6, delete "and" (first occurrence)

Signed and Sealed this

Twenty-ninth Day of July, 2003

JAMES E. ROGAN
*Director of the United States Patent and Trademark Office*